United States Patent [19]

Mugnai

[11] Patent Number: 4,601,159
[45] Date of Patent: Jul. 22, 1986

[54] FORM-FILL-SEAL MACHINE AND METHOD WITH CAPABILITY FOR PROVIDING A VACUUM OR INERT GAS ATMOSPHERE WITHIN THE PACKAGE

[75] Inventor: Giorgio Mugnai, Rho, Italy

[73] Assignee: W. R. Grace & Co., Cryovac Div., Duncan, S.C.

[21] Appl. No.: 766,220

[22] Filed: Aug. 16, 1985

[30] Foreign Application Priority Data

Sep. 14, 1984 [GB] United Kingdom ............... 8423209

[51] Int. Cl.$^4$ .................... B65B 31/08; B65B 31/06; B65B 9/06; B65B 9/20
[52] U.S. Cl. ......................................... 53/511; 53/550
[58] Field of Search ................. 53/550, 551, 450, 451, 53/433, 434, 511, 512

[56] References Cited

U.S. PATENT DOCUMENTS

| | | | |
|---|---|---|---|
| 2,387,812 | 10/1945 | Sonneborn et al. | 53/511 X |
| 3,009,298 | 11/1961 | Gerlach et al. | 53/550 X |
| 3,524,298 | 8/1970 | Hamilton | 53/511 X |
| 3,857,222 | 12/1974 | Grebe | 53/511 |
| 3,938,298 | 2/1976 | Luhman et al. | 53/511 X |
| 3,995,407 | 12/1976 | Segale et al. | 53/511 |
| 4,170,863 | 10/1979 | Schwanz | 53/511 |

FOREIGN PATENT DOCUMENTS

1032182 6/1966 United Kingdom .

Primary Examiner—Horace M. Culver
Attorney, Agent, or Firm—John J. Toney; William D. Lee, Jr.; Mark B. Quatt

[57] ABSTRACT

A machine for packaging articles in continuous tubular material, which may be formed by rolling the marginal edges of a flat web around a succession of the product articles to bring the marginal edges into contact and then sealing them continuously to complete the tube, comprises a pair of transverse sealing jaws 14 and 15 which each include a hemi-cylindrical chamber 24 having gas-pervious walls 16 and defining a cylindrical space 25 initially centrally divided by the film between two successive product articles 1.

The film extending diametrically across the space 25 is first of all severed and then suction is applied to the gas-pervious walls 16 to draw the film into contact with the walls 16. To the righthand side of the space 25 is a double impulse sealing system 18, 19 centrally divided by a knife 21 which separates a righthand pack 28 from the film in the space 25, and to the lefthand side of that space 25 is a further double impulse sealing system 18, 20, again with a knife 22 to effect separation. The sealing pads 20 at the lefthand side are movable by means of push rods 27 so that initially they allow the pack 8b to be communicated with the space 25 while the pack 8a has been separated from the space 25, and this enables gas from within the pack 8b to be extracted by way of the hemi-cylindrical chambers 24 and the suction conduits 17. Subsequently the two sealing pads 20 are pressed into contact with their counterpressure pads 18 and the righthand side of the pack 8b is then isolated from the space 25.

Such a machine allows the individual packages to be evacuated so that after the conventional post-shrinking step they are even tidier than in the prior art and the interior is substantially air-free. Alternatively an inert flushing gas may be injected into the pack from the cylindrical space 25 to allow a residual atmosphere of the inert gas in the finished pack.

FIG. 2 shows the arrangement before the beginning of evacuation and FIG. 4 shows the arrangement during evacuation.

4 Claims, 7 Drawing Figures

FORM-FILL-SEAL MACHINE AND METHOD WITH CAPABILITY FOR PROVIDING A VACUUM OR INERT GAS ATMOSPHERE WITHIN THE PACKAGE

It is known to provide a form-fill-seal machine which uses a continuous web of film material to enclose a succession of spaced packages and the film is then longitudinally sealed so as to form a tubular assembly of film around the packages, after which transverse seals are formed to separate the individual packages from one another and to seal these tubular packages at each end.

In U.S. Pat. Nos. 3,995,407 and 4,044,524 there is disclosure of a form-fill-seal machine which additionally includes a suction lance to extract air from a region of the tubular assembly of film which will coincide with the subsequent line of transverse severance between two packages, the arrangement being such that at the time of operation of the suction lance in that region between two successive products, the space around one of the products is still in communication with the region from which air is being extracted by the lance, and the other of the products is isolated from that region by way of a seal which has just been made. In these two prior U.S. Patents, suction pads are used to hold the film walls apart in that region, to either side of the line of action of the suction lance, so as to ensure that the film walls do not collapse onto and close the end of the suction lance.

Another way of providing an inert gas atmosphere or a vacuum interior to packages formed by a longitudinal form-fill-seal machine is disclosed in Published British Patent Application No. 2,124,995A where the packages are first of all sealed at one end and left open at the other end as a result of the longitudinal form-fill-seal operation, and are then transferred onto a different movement path in which they move transversely with respect to the line of product movement during the form-fill-seal operation, and the unsealed ends of the package are introduced into a suction chamber along which they pass during this second phase of movement, to allow a prolonged evacuation operation to be performed on the open package end, following which that package end is closed and sealed.

It is an object of the present invention to provide an improved form-fill-seal machine having capacity for either evacuating the finished pack or leaving it containing a residue of air-flushing inert gas, but with a much more effective rate of air extraction from within the package (either by suction or by gas flushing).

Accordingly, one aspect of the present invention provides a process for packaging articles in plastics film, comprising: arranging a tube of plastics film around a succession of the articles; severing the tube along a line transversely of its longitudinal axis; sealing a first end of the severed tubular portion of the film which surrounds a said article; extracting air from within the said tubular film portion through the other end of said tubular film portion; and then sealing said other end; wherein the process is carried out during longitudinal movement of the articles and the film tube parallel to the longitudinal axis of the film tube, by means of travelling severing and sealing means which include an air extraction chamber extending substantially the full length of the transverse seal line to be formed.

A further aspect of the present invention provides apparatus for packaging articles in plastics film, comprising: means for advancing a succession of packages enclosed within a tubular film along a first direction of movement; transverse sealing and severing means to sever the film portions enclosing the respective product articles from one another and to seal the ends of said film portions along seal lines transverse to said first direction; and means for extracting air from within a said tubular film portion whose end is being sealed; wherein said sealing and severing means comprise jaws mounted for movement towards and away from said first direction of movement in a direction mutually perpendicular to both the extent of the severing line and said first direction, so as to allow a said article to pass between the jaws and then to close together to clamp a film region between two successive said articles for air extraction and severing, and an air extraction chamber extending along each said jaw for a length at least as great as the said seal line thereof; and wherein said carrier members include an air extraction chamber provided with means for opening an end of a said tubular film portion being severed and sealed, for maintaining that film portion wide-open along the full length of said end in communication with said air extraction chamber.

Yet a third aspect of the present invention provides a pack formed by the above identified process and apparatus of the first two aspects of the invention.

In order that the present invention may more readily be understood the following description is given, merely by way of example, with reference to the accompanying drawings in which:

FIG. 2 is a detail view of the clamping and sealing jaws as they are just about to close together at the end of phase 1 illustrated in FIG. 1a;

FIG. 3 is a view similar to FIG. 2 but showing the clamping and sealing jaws after they have closed together and while they are moving along the line of action illustrated at phase 2 in FIG. 1a;

FIG. 4 shows the clamping and sealing jaws as they approach the end of phase 2 of FIG. 1a;

FIG. 5 is a view similar to FIG. 2 but showing the clamping and sealing jaws as they begin to separate on commencement of phase 3 of FIG. 1a; and FIG. 6 shows the fully separated configuration of the clamping and sealing jaws approaching the end of phase 3 of FIG. 1a.

Figures 1, 1A:
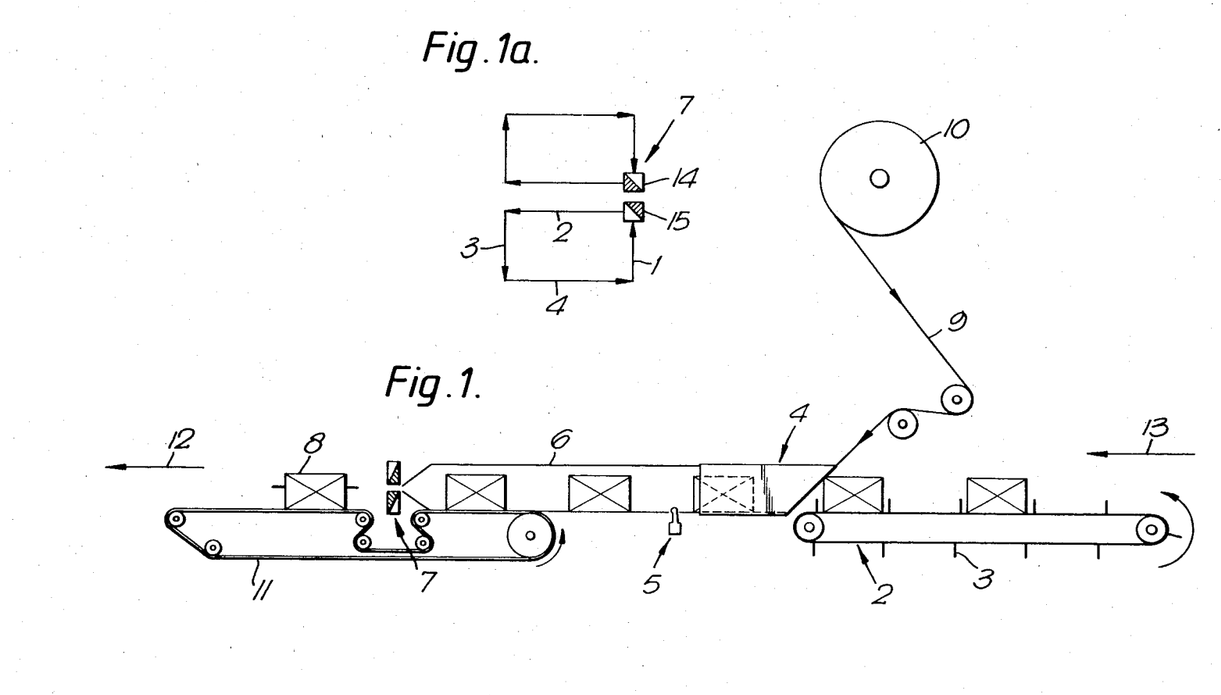
FIG. 1 is a general view of a form-fill-seal machine with which the improvement of the present invention can be employed.
FIG. 1a is a schematic view showing the locus of movement of each of the two clamping and sealing jaws which effect the transverse seal in the machine shown in FIG. 1.

Referring now to the drawings, FIG. 1 shows a succession of product articles 1 which are first of all placed on a feed conveyor 2 having discrete pockets defined by spacer members 3, and the articles 1 are then advanced through a film forming box 4 past a longitudinal film sealing station 5 which completes a tubular assembly 6 of the film to be transversely sealed at a transverse sealing station 7 where the individual product articles are then separately enclosed as finished packs 8.

A flat web 9 of multi-layer film is advanced from a supply roll 10 and over guide rolls on its way towards the film forming box where that flat web 9 has its marginal regions tucked under the product article 1 and placed in contact with one another ready for sealing by the longitudinal seal means 5. The longitudinal seal means is of a type known per se and the expert in the art will not need a detailed illustration or description of that seal means in order to understand the workings of the present invention.

The severed packs 8 are supported on a delivery conveyor 11 ready to be advanced along the direction of arrow 12 to a shrink station (not shown) for tidying of the individual packs 8.

The direction of feed of the product articles 1 is illustrated by arrow 13 and thus it will be appreciated that the line of product articles follows a continuous substantially rectilinear flow, from right to left of FIG. 1, and that during that movement the articles become wrapped in a tubular film and then sealed within severed tubular portions of that film.

FIG. 1a illustrates in more detail the operation of the sealing station 7 and from FIG. 1a it will be appreciated that the upper and lower sealing jaws 14 and 15 of the sealing station 7 first of all close together along a phase of movement 1 and then embark along a horizontal leftward movement path in contact with one another, representing a phase 2 of FIG. 1a. The position of the upper and lower clamping and sealing jaws representing the station 7 in FIG. 1 is the position they will occupy at the end of movement phase 2.

Subsequently, the two upper and lower clamping and sealing jaws 14 and 15 separate from one another and then move counter-current in relation to the direction of product advance to position themselves ready for the next cycle beginning with movement phase 1.

Figure 2:
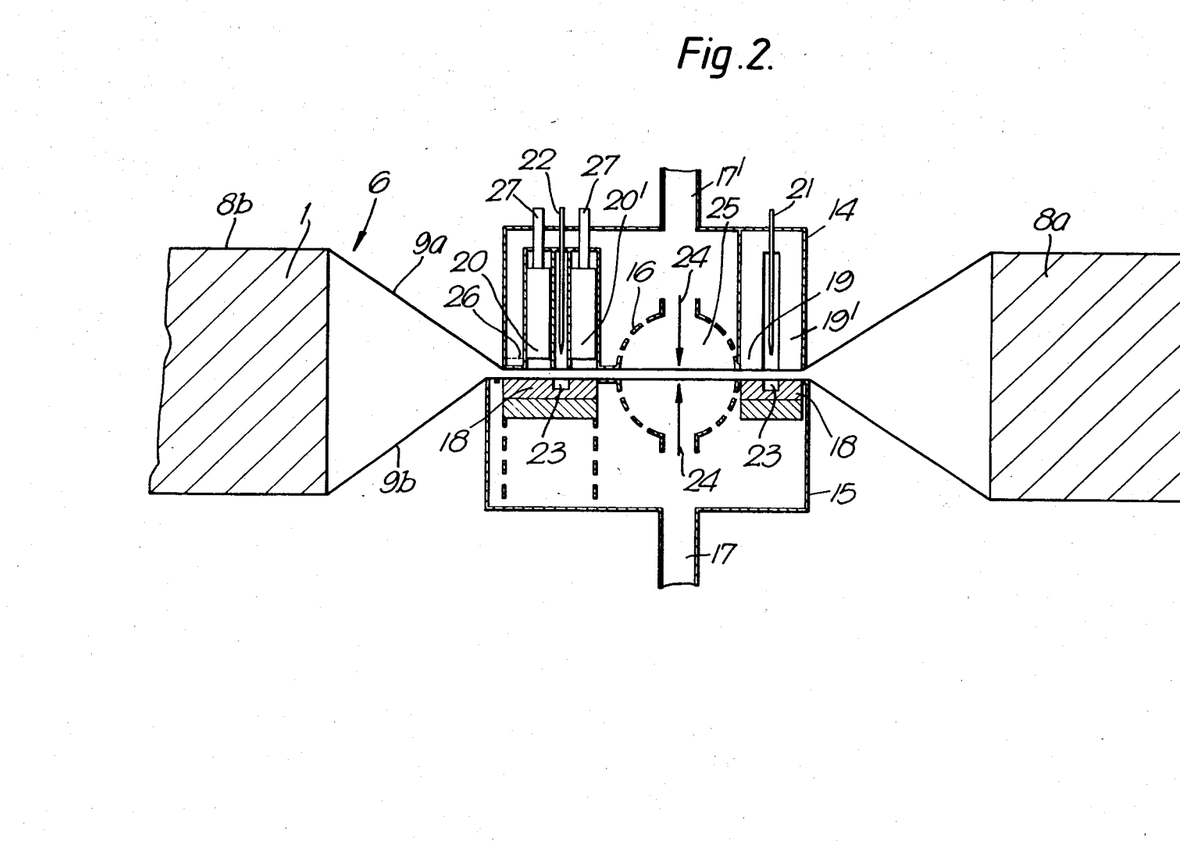

FIG. 2 shows the configuration of the upper and lower clamping and sealing jaws 14 and 15 towards the end of movement phase 1, and illustrates that each of the jaws 14, 15 has extending therealong a hemi-cylindrical chamber defined by gas-pervious walls 16 communicated with a source of vacuum by means of a respective vacuum conduit 17 to each of the jaws 14 and 15. The lower jaw 15 has righthand and lefthand counter-pressure pads 18 in its upper surface, to be engaged by appropriate heat sealing bars 19 at the righthand side of the upper clamping and sealing jaw 14 in FIG. 2 and 20 at the lefthand side of upper jaw 14 in that Figure.

The two righthand heat sealing bars 19 are associated with a severing knife 21 and the two lefthand heat sealing bars 20 are associated with a further severing knife 22, both shown retracted in the FIG. 2 configuration.

The counter-pressure pads 18 have suitable recesses 23 to accommodate the cutting edges of the knife blades in the extended positions of the blades 21 and 22.

Further cutting means 24 are schematically illustrated in FIG. 2, and are effective to sever the flat tubular film region extending across the centre of the cylindrical space made up of the two hemi-cylindrical suction chambers of the clamping and sealing jaws 14 and 15.

Figure 3:
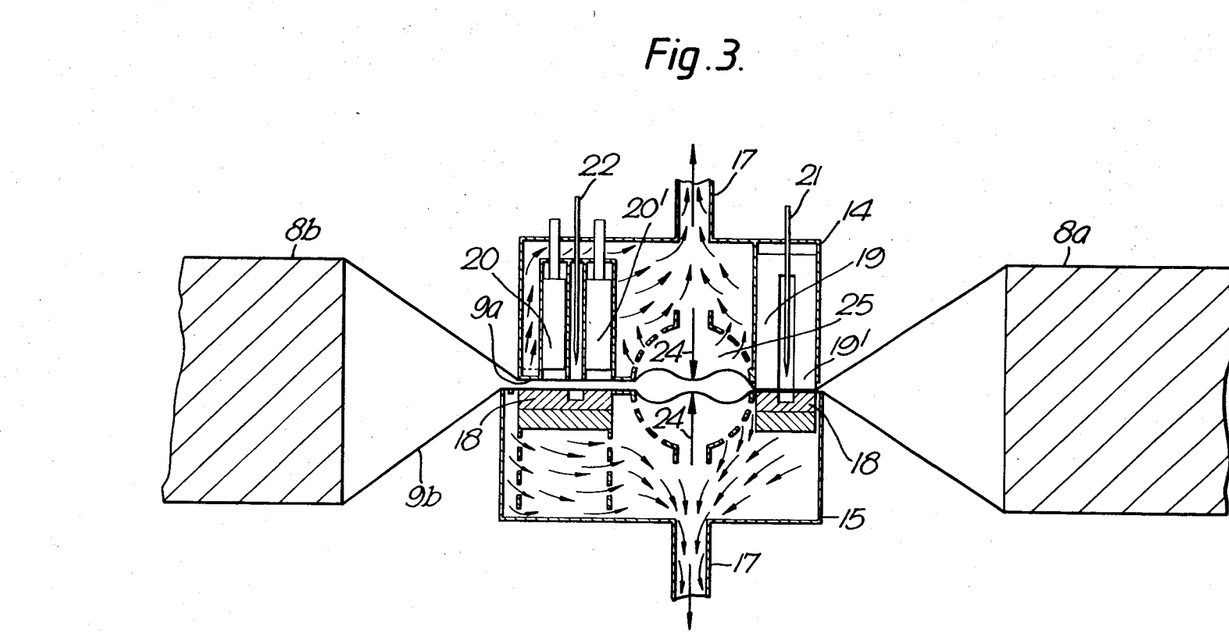

As shown in FIG. 3, when suction is applied to the suction conduits 17, air is extracted from not only the cylindrical space, here referenced 25, but also from the interior of the lefthand pack, here referenced 8b, while the righthand pack 8a has been isolated from the cylindrical space 25 by closing together of the heat sealing bars 19 on counter-pressure pad 18 and operation of knife 21.

At the lefthand side of the upper jaw 14 there is an elongate region 26 (FIG. 2) along which the underside of the upper jaw 14 is gas-pervious so suction applied to the interior of the upper jaw 14 also attracts the upper, 9a, of the two film walls 9a and 9b constituting the tubular assembly 6 away from contact with the lower film wall 9b and onto the gas-pervious elongate region to maintain an open passage communicating, on the one hand, the product article 1 in the lefthand pack 8b with, on the other hand, the cylindrical space 25. A similar gas-pervious elongate suction region is formed at 27 at the lefthand end of the lower clamping and sealing jaw 15. The same suction causes the film region in the cylindrical space 25 to balloon onto the blades 24.

The two heat sealing bars 20 at the lefthand side of the upper jaw 14, to either side of the cutting knife 22, are movable vertically by virtue of actuating push rods 27, and are driven so that they only come into contact with the film walls 9a and 9b after operation of the knife 22.

Figure 4:
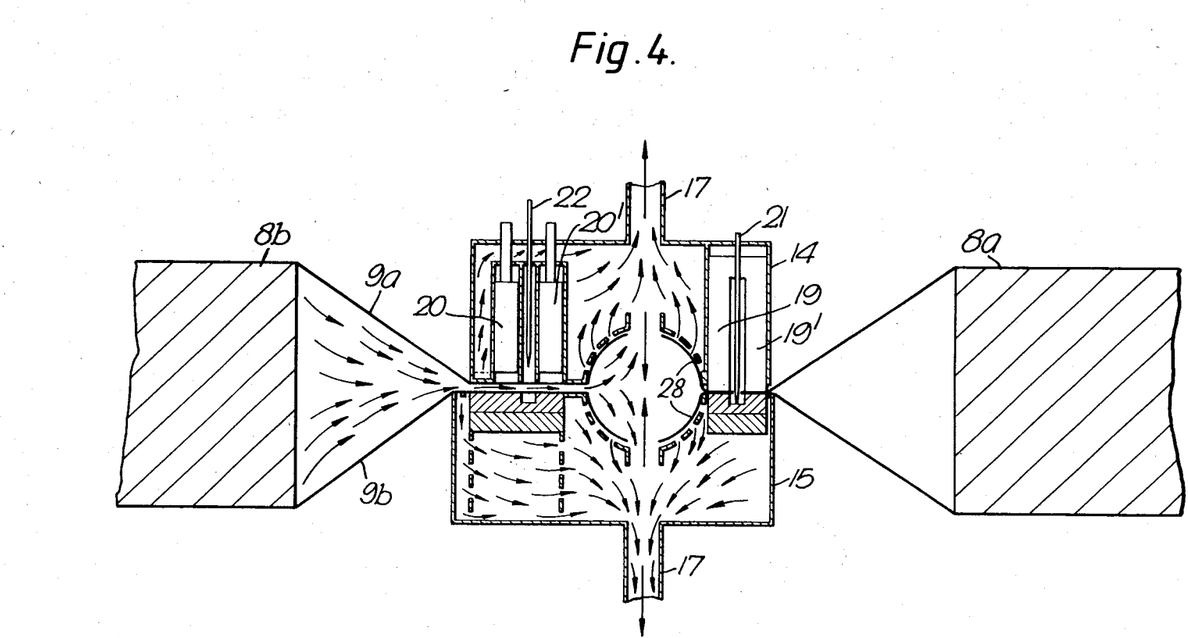

FIG. 4 shows the configuration of the upper and lower clamping and sealing jaws 14 and 15 shortly before the termination of movement phase 2 of FIG. 1a and while vacuum is applied through the conduits 17 to hold the severed film ends, here referenced 28, in contact with the gas-pervious walls 16 defining the two hemi-cylindrical suction chambers. This maintains the mouth of the tube forming the pack 8b on the lefthand side of FIG. 4 open so as to facilitate escape of gas from within that pack, as depicted by the various arrows in FIG. 4. The cross-sectional area of the evacuation passage-way is considerable since although, as shown in FIG. 4, there is only a small height to the passageway between the film walls 9a and 9b directly beneath the heat sealing bars 20, that passageway has a considerable width in that it extends across substantially the full width of the pack 8b.

Figure 5:
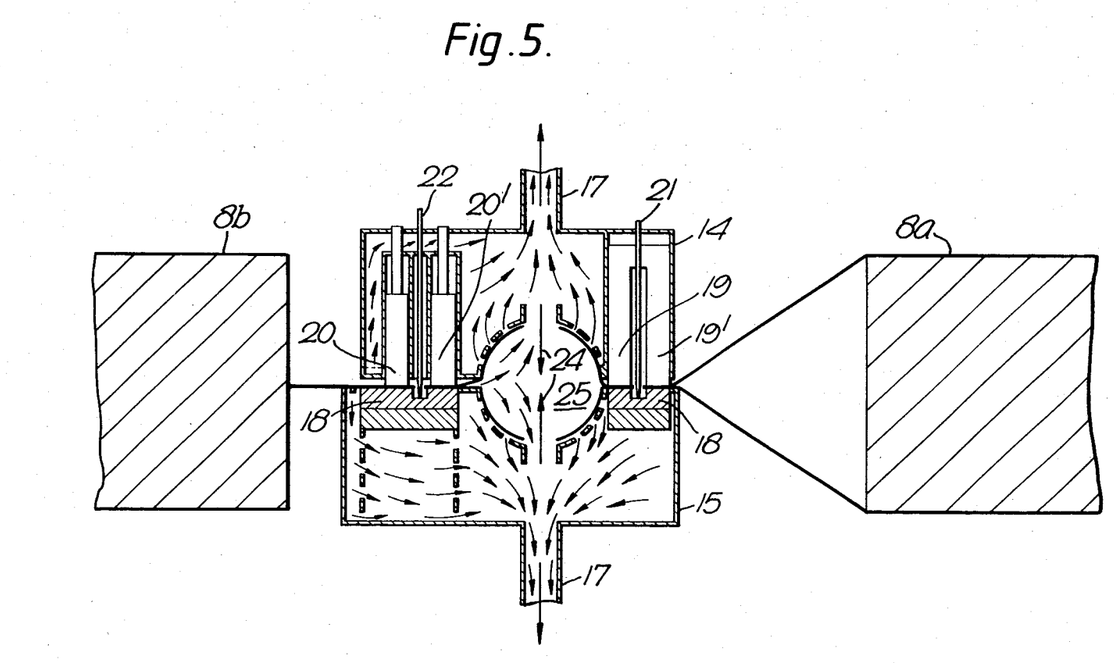

FIG. 5 shows the arrangement when the two movable heat sealing bars 20 have been pressed down into contact with the film walls 9a and 9b and the cutting blade 22 has been depressed to sever the film region within the cylindrical space 25 from the film walls 9a and 9b enveloping the pack 8b to trim off excess film.

Figure 6:
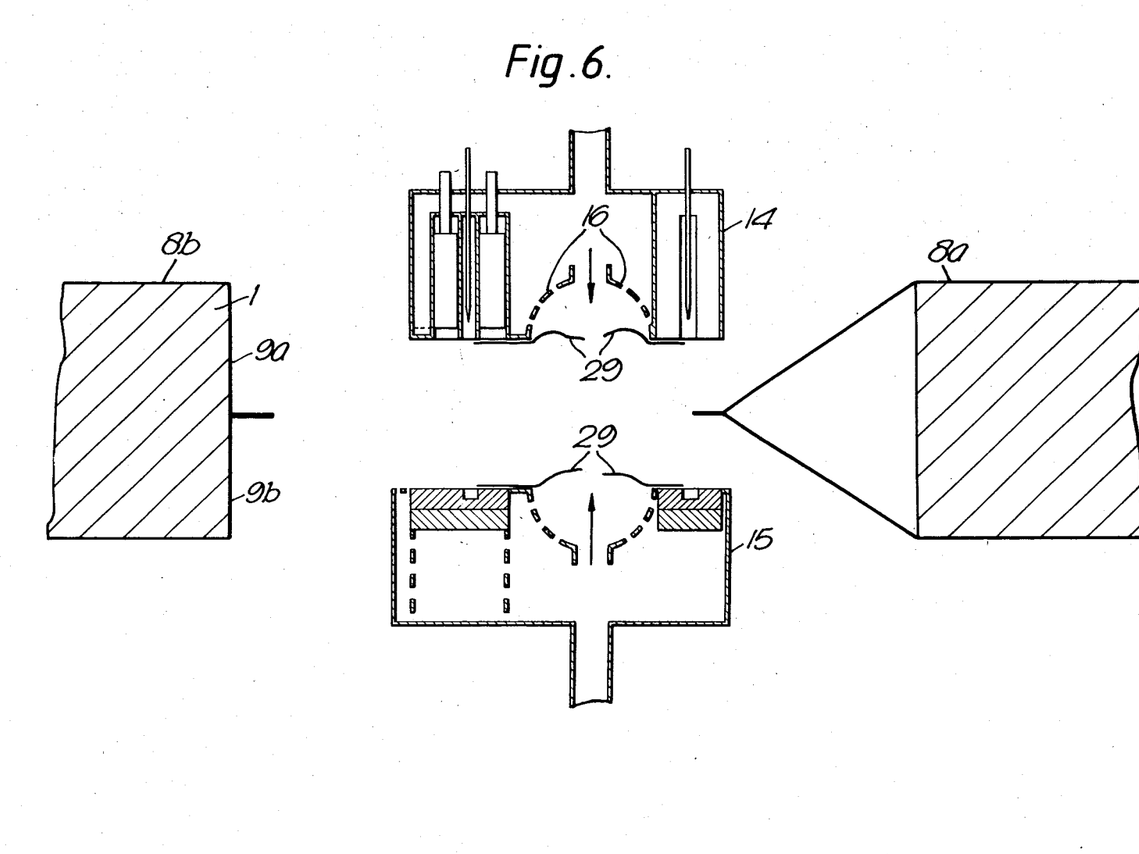

FIG. 6 shows the arrangement slightly later after the vacuum within the pack 8b has caused the film walls 9a and 9b to contract tidily into contact with the righthand end of the product article 1 and remnants 29 of film remain attached to the upper and lower clamping and sealing jaws 14 and 15 in the vicinity of their hemi-cylindrical chambers.

In order to illustrate the operation of the machine in FIG. 1, one operating cycle of the transverse sealing station 7 will now be described, with reference to FIGS. 2 to 6.

At the end of the retreating movement phase 4 of FIG. 1a the two jaws 14 and 15 are vertically above one another but spaced apart so as to allow the tubular film assembly 6 and the enclosed product articles 1 to pass therebetween. Once a gap between two successive product articles 1 arrives in register with the space between the upper and lower clamping and sealing jaws 14 and 15, or at least they are in a position in which, as the jaws 14 and 15 close together they will contact the film region in such a gap between product articles 1, the jaws 14 and 15 commence their closing movement along phase 1. Shortly before they come together they arrive at the FIG. 2 configuration when the film walls 9a and 9b come into contact with the elongate gas-pervious regions 26 and 27 of the upper and lower clamping and sealing jaws and as can be seen from FIG. 2 the heat sealing bars 19 at the righthand side of the upper jaw 14 are nearer, to coming into contact with their counter-pressure pad 18 than are the corresponding heat sealing bars 20 at the lefthand side.

As the righthand sealing bars 19 come into contact with their counter-pressure pad 18 the jaw 14, 15 together with the tubular film assembly 6 and the two adjacent enclosed product articles 1 begin leftward movement along the movement phase 2. As soon as the two film walls 9a and 9b at the righthand side of the jaws 14 and 15 have been pressed together, and possibly even before a heat seal has been completed, vacuum is applied through the suction conduits 17 ballooning the film onto the cutting means 24 at the centre of the cylindrical space 25 which sever the now clamped film walls 9a and 9b at the righthand side of the clamping and sealing jaws 14 and 15 from the corresponding portion at the lefthand side still attached to the pack 8b.

At any convenient time during advance of the clamping and sealing jaws and tubular film assembly 6 along movement phase 2, the knife 21 is driven for downward movement to sever the lefthand end of the pack 8a from the remainder of the film within the cylindrical space 25.

As the suction is applied to the gas-pervious walls 16 of the hemi-cylindrical chambers, the severed ends formed at the cut along arrows 24 in the centre of the cylindrical space 25 are free to attach themselves to the gas-pervious walls 16 under the influence of the suction applied through the suction conduits 17, thereby maintaining an unobstructed access for the gas within the righthand end of the lefthand pack 8b to the cylindrical space 25. This attachment may or may not occur before operation of the knife 21. The operation of the cutting means at 24 coincides with arrival at the FIG. 3 configuration.

During the continued leftward movement along movement phase 2, the heat sealing bars 19 are energised to apply a sealing impulse of heat to ensure permanent closure of the lefthand end of the righthand pack 8a. This sealing may occur either before or after operation of the knife 21.

In FIG. 4, the extraction of air from within the righthand end of pack 8b is well underway and it will of course be appreciated that air will simultaneously be extracted from the already closed lefthand end of the pack 8b (this closure having been effected during the previous sealing operation when the clamping and sealing jaw assembly 14, 15 was operating at the righthand side of the pack now shown at 8a in FIG. 4).

Upon termination of the suction stage, and before termination of the movement phase 2, the two movable heat sealing bars 20 are driven downwardly against the film walls 9a and 9b and are energised to apply a sealing impulse which heat seals the film walls together. Simultaneously, or slightly thereafter, the cutter knife 22 is operated, as shown in FIG. 5. At this stage the righthand end of the lefthand pack 8b is, like the lefthand end of the righthand pack 8a, completely separated from the film remnants 29 within the cylindrical space 25.

Once the two clamping and sealing jaws 14, 15 have separated to begin movement phase 3, the lefthand pack 8b is able to be advanced more rapidly by means of the delivery conveyor 11, and the film remnants 29 are removed from inside the cylindrical space 25, either by applying an air blast into the space 25 through the foraminous walls 16, or by means of any other film-ejecting mechanism, for example a brush.

In order further to assist separation of the film remnants 29 from the upper jaw 14, the two movable heat sealing bars 20 become retracted by lifting of their push rods 27 before separation of the upper and lower jaws 14 and 15 begins, thereby retracting the sealing bars 20 out of contact with the film portion 9a which they have just sealed.

As movement phase 3 continues, the upper and lower jaws 14 and 15 eventually become sufficiently widely separated to allow the pack 8a to pass between them while they are retreating to perform the vacuumising operation at the righthand end of pack 8a and sealing of the lefthand end of the next successive package (not shown).

In the FIG. 6 configuration, the lefthand pack has been evacuated ready for shrinking, and the righthand pack 8a has had its longitudinal bottom seal completed by means of the longitudinal sealing means 5. Thus, as one continuous operation, the tubular film assembly 6 is formed around the succession of product articles 1, the bottom longitudinal seal is formed, and the transverse seal is formed together with evacuation of the leading pack 8b of the string and simple closure of the leading end of the rest of the string (in other words the lefthand end of the pack 8a).

Although the above description refers to evacuation as the method of extracting air from the interior of the pack 8b, it is of course possible for the narrow air extraction passageway of low height to be used both for extraction of air and for introduction of an inert flushing gas which displaces that air to achieve extraction. This would need some means for introducing the flushing gas into the cylindrical space 25 enclosed by the two hemi-cylindrical chambers of the upper and lower clamping and sealing jaws 14 and 15.

Furthermore, although throughout this description the upper and lower clamping and sealing jaws 14 and 15 have been described as following a rectangular movement cycle as depicted in FIG. 1, it is possible for some alternative movement pattern to be adopted, for example that disclosed in our U.K. Patent Application No. 8333391.

I claim:

1. Apparatus for packaging articles in plastics film, comprising:
    (a) means for advancing a succession of packages enclosed within a tubular film along a first direction of movement;
    (b) transverse sealing and severing means to sever the film portions enclosing the respective product articles from one another and to seal the ends of said film portions along seal lines transverse to said first direction; and
    (c) means for extracting air from within a said tubular film portion whose end is being sealed; wherein said sealing and severing means comprise
        (i) jaws mounted for movement towards and away from said first direction of movement in a direction mutually perpendicular to both the extent of the severing line and said first direction, so as to allow a said article to pass between the jaws and then to close together to clamp a film region between two successive said articles for air extraction and severing,
        (ii) and an air extraction chamber extending along each said jaw for a length at least as great as the said seal line thereof; and
        (iii) wherein said carrier members include an air extraction chamber provided with means for opening an end of a said tubular film portion being severed and sealed, for maintaining that film portion wide-open along the full length of said end in communication with said air extraction chamber;

(iv) the jaws including gas-pervious suction regions along one side thereof, for holding the opposed walls of a said tubular film portion apart to maintain the interior of said tubular film portion in communication with said air extraction chamber during extraction of air through the open end of said tubular film portion, (d) first severing means to rupture said film between the jaws along a first transverse severance line in said region between two successive articles for severing the tubular film portion enclosing the respective said adjacent articles:

(e) second severing means to one side of said first severing means for trimming an unsealed end of a first said tubular film portion between the jaws;

(f) third severing means to the other side of said first severing means for trimming an unsealed end of a second said tubular film portion which end is used for extraction of air from within said second tubular film portion before the operation of said third severing means:

(g) first sealing means alongside and second severing means for providing a trim seal at said end of the first tubular film portion; and, (h) second sealing means alongside said third severing means for providing a trim seal of said second tubular film portion.

2. Apparatus according to claim 1, wherein said jaws move along a rectangular path having first and second sides parallel to said first direction, and third and fourth sides perpendicular to said first direction whereby along said first side the jaws are in co-operation with one another and operative to sever the said film region between adjacent articles and to seal the associated end of said first tubular film portion and to extract air from said second film portion and to seal it, and along said second side the carrier members are spaced sufficiently to allow the associated end of said second film protion to be maintained open along the full length of the seal line for extraction of air from within the said second tubular film portion prior to actuation of said second sealing means and said third severing means to close said second tubular film portion and to sever the unsealed end portion thereof located in the air extraction chamber.

3. Apparatus according to claim 2, wherein said second sealing means comprise movable sealing members which are able to adopt a first position in which they are retracted clear of the said second tubular film portion and a second position in which they press together walls of said second tubular film portion to effect sealing thereof.

4. Apparatus according to claim 1, wherein the air extraction chamber is a suction chamber communicated with a source of suction and provided with gas-pervious walls through which further suction is applied, said suction chamber being formed of two parts a first of which is defined by one of said jaws and the second of which is defined by the other said jaw.

* * * * *